(12) United States Patent
Yoshioka et al.

(10) Patent No.: US 12,186,774 B2
(45) Date of Patent: Jan. 7, 2025

(54) QUALITY CONTROL SYSTEM AND QUALITY CONTROL PROGRAM

(71) Applicant: Taikisha Ltd., Tokyo (JP)

(72) Inventors: Hidehisa Yoshioka, Tokyo (JP); Tomoo Yamashita, Tokyo (JP)

(73) Assignee: Taikisha Ltd., Tokyo (JP)

( * ) Notice: Subject to any disclaimer, the term of this patent is extended or adjusted under 35 U.S.C. 154(b) by 779 days.

(21) Appl. No.: 17/051,758

(22) PCT Filed: Jul. 20, 2020

(86) PCT No.: PCT/JP2020/028054
§ 371 (c)(1),
(2) Date: Oct. 29, 2020

(87) PCT Pub. No.: WO2021/140690
PCT Pub. Date: Jul. 15, 2021

(65) Prior Publication Data
US 2023/0158540 A1 May 25, 2023

(30) Foreign Application Priority Data
Jan. 10, 2020 (JP) .................................. 2020-002795

(51) Int. Cl.
*B05C 9/12* (2006.01)
*B05C 11/10* (2006.01)

(52) U.S. Cl.
CPC ................ *B05C 9/12* (2013.01); *B05C 11/10* (2013.01)

(58) Field of Classification Search
CPC .................................. B05C 9/12; B05C 11/10
See application file for complete search history.

(56) References Cited

U.S. PATENT DOCUMENTS

| | | | |
|---|---|---|---|
| 5,429,682 A * | 7/1995 | Harlow, Jr. | ........ G05B 19/4182 118/712 |
| 6,507,803 B1 | 1/2003 | Fickmeyer et al. | |

(Continued)

FOREIGN PATENT DOCUMENTS

| | | |
|---|---|---|
| JP | 6148090 A | 5/1994 |
| JP | H6142565 A | 5/1994 |

(Continued)

*Primary Examiner* — Dah-Wei D. Yuan
*Assistant Examiner* — Stephen A Kitt
(74) *Attorney, Agent, or Firm* — The Webb Law Firm (57) ABSTRACT

A quality control system for controlling quality of a paint target includes: an individual identification section associating a step control value and a quality control value with identification information for the paint target on the basis of the amount of movement; a state value computing section calculating a state value indicative of a paint state of the paint target on the basis of a history of a temporal change of the step control value; a learning section learning a correlation between the step control value, the state value, and the quality control value using sets of the step control value, the state value, and the quality control value; an input device receiving information on the amount of movement, the step control value, and the quality control value; and a storage device storing a set of the identification information, the step control value, the state value, and the quality control value.

16 Claims, 6 Drawing Sheets

(56) References Cited

U.S. PATENT DOCUMENTS

| | | | |
|---|---|---|---|
| 6,701,193 B1 | 3/2004 | Filev et al. | |
| 2003/0000461 A1* | 1/2003 | Krueger | C03C 17/002 |
| | | | 118/200 |
| 2006/0134333 A1* | 6/2006 | Nagase | B05D 7/578 |
| | | | 427/299 |
| 2006/0177566 A1 | 8/2006 | Price | |
| 2017/0056901 A1* | 3/2017 | Tani | B05B 5/0533 |
| 2017/0261438 A1* | 9/2017 | Okçuoglu | B05D 5/005 |
| 2018/0354126 A1 | 12/2018 | Ueda | |
| 2018/0369854 A1* | 12/2018 | Zolli | B05D 1/28 |
| 2019/0024316 A1* | 1/2019 | Buist | B05D 1/002 |
| 2019/0331483 A1 | 10/2019 | Sano et al. | |
| 2022/0214671 A1† | 7/2022 | Alt | |

FOREIGN PATENT DOCUMENTS

| | | | | | |
|---|---|---|---|---|---|
| JP | 200170846 | A | 3/2001 | | |
| JP | 2007258731 | A | 10/2007 | | |
| JP | 2008529756 | A | 8/2008 | | |
| JP | 2014106841 | A | 6/2016 | | |
| JP | 2018144007 | A | 9/2018 | | |
| JP | 2018206162 | A | 12/2018 | | |
| JP | 2019098303 | A | 6/2019 | | |
| KR | 20070115731 | A * | 12/2007 | | B05D 1/02 |
| WO | 2019171498 | A1 | 9/2019 | | |

\* cited by examiner
† cited by third party

QUALITY CONTROL SYSTEM AND QUALITY CONTROL PROGRAM

CROSS-REFERENCE TO RELATED APPLICATIONS

This application is the United States national phase of International Application No. PCT/JP2020/028054 filed Jul. 20, 2020, and claims priority to Japanese Patent Application No. 2020-002795 filed Jan. 10, 2020, the disclosures of which are hereby incorporated by reference in their entirety.

TECHNICAL FIELD

The present invention relates to a quality control system and a quality control program.

BACKGROUND ART

The quality of paint is influenced by various parameters in painting steps. There have thus been efforts made to make clear the relationship between how painting steps are performed and the quality of paint on a paint target. Japanese Unexamined Patent Application Publication No. 2019-98303 (Patent Literature 1), for example, discloses a spraying condition information computing device configured to learn how parameters in a cleaning step are related to how well a paint material adheres to a work surface. Japanese Unexamined Patent Application Publication No. 2019-192131 (Patent Literature 2) discloses an analysis device configured to analyze the cause of a paint coat lump with use of a learned neural network obtained by learning the relationships each between an image captured of a paint coat lump and a presumed cause of that paint coat lump.

CITATION LIST

Patent Literature

Patent Literature 1
   Japanese Unexamined Patent Application Publication, Tokukai, No. 2019-98303
Patent Literature 2
   Japanese Unexamined Patent Application Publication, Tokukai, No. 2019-192131 (or U.S. Patent Application Publication No. 2019331483, specification)

SUMMARY OF INVENTION

Technical Problem

Work of paint on a relatively large paint target such as a vehicle body involves a plurality of painting steps with a larger number of step control items as well as various quality control items. Such many step control items and quality control items are correlated to each other in extremely complicated manners. The correlations are not necessarily made clear by techniques such as those of Patent Literatures 1 and 2. Further, while the paint quality may be influenced greatly by, rather than a step control value itself for a painting step, a history of a temporal change of the step control value, such a temporal change history is not sufficiently taken into consideration for application of techniques such as those of Patent Literatures 1 and 2.

The above circumstances have led to a demand for a quality control system and quality control program each capable of making clear correlations between (i) many step control items and a history of a temporal change of those step control items and (ii) many quality control items.

Solution to Problem

A quality control system according to the present invention is a quality control system capable of controlling quality of a paint target on a painting line, the painting line including: a conveyor facility capable of conveying the paint target along a conveyance path; a paint facility group including a plurality of paint facilities arranged along the conveyance path; and an inspection facility capable of inspecting the paint target, the conveyor facility being provided with a movement amount detector capable of detecting an amount of movement of the paint target, the paint facility group being provided with one or more measurement apparatuses capable of detecting one or more step control values related to paint work performed at the plurality of paint facilities, the inspection facility being provided with at least either of (i) one or more inspection apparatuses capable of detecting a quality control value of each of one or more quality control items related to the quality of the paint target and (ii) an input apparatus capable of receiving information on the quality control value determined through manual inspection, the quality control system including: an individual identification section capable of associating the one or more step control values and the quality control value with individual identification information for the paint target on a basis of the amount of movement; a state value computing section capable of calculating one or more state values each indicative of a paint state of the paint target on a basis of a history of a temporal change of the one or more step control values; a learning section capable of learning a correlation between the one or more step control values, the one or more state values, and the quality control value with use of a plurality of sets of the one or more step control values, the one or more state values, and the quality control value; an input device capable of receiving information on the amount of movement, the one or more step control values, and the quality control value; and a storage device capable of storing a set of the individual identification information, the one or more step control values, the one or more state values, and the quality control value.

A quality control program according to the present invention is a quality control program capable of being installed on a computer for controlling quality of a paint target on a painting line, the painting line including: a conveyor facility capable of conveying the paint target along a conveyance path; a paint facility group including a plurality of paint facilities arranged along the conveyance path; and an inspection facility capable of inspecting the paint target, the conveyor facility being provided with a movement amount detector capable of detecting an amount of movement of the paint target, the paint facility group being provided with one or more measurement apparatuses capable of detecting one or more step control values related to paint work performed at the plurality of paint facilities, the inspection facility being provided with at least either of (i) one or more inspection apparatuses capable of detecting a quality control value of each of one or more quality control items related to the quality of the paint target and (ii) an input apparatus capable of receiving information on the quality control value determined through manual inspection, the quality control program being configured to cause the computer to perform: a function of receiving an input of information on the amount of movement, the one or more step control values, and the quality control value; a function of associating the one or more step control values and the quality control value with individual identification information for the paint target on a basis of the amount of movement; a function of calculating one or more state values each indicative of a paint state of the paint target on a basis of a history of a temporal change of the one or more step control values; a function of storing a set of the individual identification information, the one or more step control values, the one or more state values, and the quality control value; and a function of learning a correlation between the one or more step control values, the one or more state values, and the quality control value with use of a plurality of sets of the one or more step control values, the one or more state values, and the quality control value.

The above arrangements each make clear correlations between (i) many step control items and a history of a temporal change of those step control items and (ii) many quality control items.

The description below deals with preferable embodiments of the present invention. The preferable embodiments described below as examples do not limit the scope of the present invention.

The quality control system according to the present invention may, as an embodiment, preferably further include: a user interface device, wherein the quality control system is capable of, if a particular one of the one or more quality control items has been selected via the user interface device, outputting information on any of the one or more step control values and any of the one or more state values, said any of the one or more step control values and said any of the one or more state values being each ranked high on a list of influence on the particular one of the one or more quality control items.

The above arrangement allows the operator to easily understand what step control item greatly influences a particular quality control item.

The quality control system according to the present invention may, as an embodiment, preferably further include: a prediction section capable of predicting the quality control value on a basis of (i) the one or more step control values, (ii) the one or more state values, which have been calculated on the basis of the one or more step control values, and (iii) the correlation.

The above arrangement allows the quality of paint on a paint target to be predicted before the start of the paint work or during the paint work.

The quality control system according to the present invention may, as an embodiment, preferably be arranged such that the prediction section triggers an alarm if the quality control value that the prediction section predicts meets a predetermined warning criterion.

The above arrangement allows the operator to easily recognize a state where the paint quality can be decreased.

The quality control system according to the present invention may, as an embodiment, preferably be arranged such that the prediction section is capable of, if the quality control value that the prediction section predicts fails to reach a predetermined quality target, suggesting a change to an operating condition for the paint facility group which change is necessary to reach the quality target.

The above arrangement allows the paint quality to be easily kept suitable.

The quality control system according to the present invention may, as an embodiment, preferably be arranged such that the paint target is an automobile body, and the individual identification information is a vehicle identification number.

The above arrangement allows each individual vehicle body to be identified with use of its vehicle identification number (VIN), which is unique to that vehicle body, and thereby eliminates the risk of duplication of the same individual identification information. Each vehicle body is given a vehicle identification number regardless of the present invention. The above arrangement thus does not require using additional individual identification information for the purpose of quality control.

Additional features and advantages of the present invention will be made clearer by the description of the exemplary and non-limiting embodiments below, which are described with reference to the drawings.

DESCRIPTION OF EMBODIMENTS

The description below deals with embodiments of a quality control system and quality control program according to the present invention with reference to drawings. The description below deals with, as an example of the quality control system according to the present invention, a quality control system 1 capable of controlling the quality of vehicle bodies B as a paint target on a painting line 100.

Arrangement of Painting Line

The description below first deals with the painting line 100 for the present embodiment. The painting line 100 is a series of facilities capable of painting vehicle bodies B (see FIG. 1). The painting line 100 includes individual sections arranged in the shape of a tunnel, and also includes a conveyor C (which is an example of the "conveyor facility"), which conveys vehicle bodies B along a single axis (that is, the left-right direction of FIG. 1) while the vehicle bodies B are subjected to work of individual painting steps. The present embodiment involves a first pretreatment step 101, a second pretreatment step 102, a third pretreatment step 103, an electrodeposition step 104, a drying step 105, and a final painting step 106 (which are an example of the "paint facility group") as well as an inspection step 107 (which is an example of the "inspection facility") along the conveyance path of the conveyor C. The quality control system 1 is capable of receiving signals from the individual steps 101 to 107 and the conveyor C.

Figure 1:
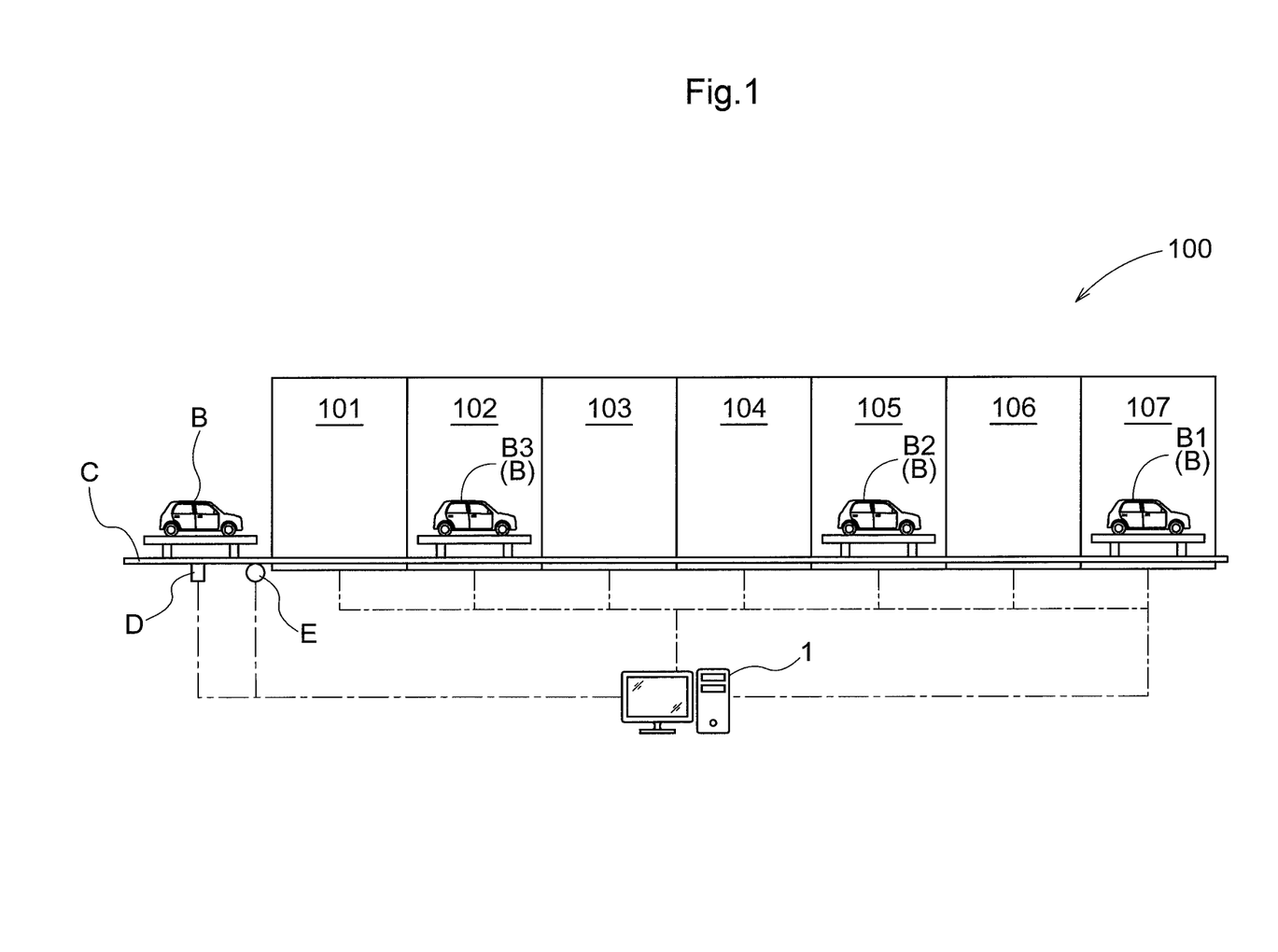
FIG. 1 is a drawing schematically illustrating a painting line for an embodiment of the present invention.

The first pretreatment step 101 is an entry step for receiving vehicle bodies B onto the painting line 100. A vehicle body B received in the first pretreatment step 101 is on standby in the first pretreatment step 101. The first pretreatment step 101 involves a thermometer and a hygrometer (each of which is an example of the "one or more measurement apparatuses") and allows the temperature and humidity (each of which is an example of the "one or more step control values") inside itself to be measured continuously. The present embodiment is an example in which vehicle bodies B pass through the first pretreatment step 101 without stopping at it. Vehicle bodies B are conveyed from the first pretreatment step 101 to the subsequent second pretreatment step 102.

The second pretreatment step 102 involves a facility configured to subject vehicle bodies B to dip cleaning, specifically immerse vehicle bodies B into a cleaning fluid to rinse and degrease the vehicle bodies B. The second pretreatment step 102 involves a thermometer (which is an example of the "one or more measurement apparatuses") and allows the temperature (which is an example of the "one or more step control values") inside itself to be measured continuously. Vehicle bodies B stop at the second pretreatment step 102 to be subjected to paint work over a predetermined time period, and are then conveyed to the subsequent third pretreatment step 103.

The third pretreatment step 103 involves a facility configured to subject vehicle bodies B to spray cleaning, specifically spray a cleaning fluid onto vehicle bodies B to rinse and chemically clean the vehicle bodies B. The third pretreatment step 103 involves (i) a flowmeter (which is an example of the "one or more measurement apparatuses") capable of measuring the flow rate (which is an example of the "one or more step control values") of the cleaning fluid and (ii) a manometer (which is an example of the "one or more measurement apparatuses") capable of measuring the pressure (which is an example of the "one or more step control values") of air flowing through a spray device configured to spray the cleaning fluid. The third pretreatment step 103 allows the flow rate and pressure to be measured continuously. Vehicle bodies B pass through the third pretreatment step 103 without stopping at it, and are conveyed to the subsequent electrodeposition step 104.

The electrodeposition step 104 involves a facility configured to subject vehicle bodies B to electrodeposition painting. The electrodeposition step 104 involves an ammeter (which is an example of the "one or more measurement apparatuses") capable of measuring the value of electric current (which is an example of the "one or more step control values") flowing through an electrodeposition painting device and allows the electric current value to be measured continuously. Vehicle bodies B stop at the electrodeposition step 104 to be subjected to electrodeposition painting over a predetermined time period, and are then conveyed to the subsequent drying step 105.

The drying step 105 involves a facility configured to dry vehicle bodies B in a high-temperature room. The drying step 105 involves a thermometer (which is an example of the "one or more measurement apparatuses") and allows the temperature (which is an example of the "one or more step control values") of vehicle bodies B to be measured continuously. Vehicle bodies B stop at the drying step 105 to be dried over a predetermined time period, and are then conveyed to the subsequent final painting step 106.

The final painting step 106 involves a facility configured to subject vehicle bodies B to final painting work. The final painting step 106 involves a tachometer (which is an example of the "one or more measurement apparatuses") capable of measuring the rotational speed (which is an example of the "one or more step control values") of a painting machine and allows the rotation speed to be measured continuously. Vehicle bodies B stop at the final painting step 106 to be subjected to paint work over a predetermined time period, and are then conveyed to the subsequent inspection step 107.

The inspection step 107 involves a facility configured to inspect the quality of paint provided on vehicle bodies B. The inspection step 107 involves (i) an inspection apparatus to automatically perform inspection to detect hues, gloss, and smoothness (each of which is an example of the "quality control value") of paint provided and (ii) manual inspection to determine the presence or absence of contamination, crawling, and unevenness (each of which is an example of the "quality control value") on the paint. The results of the manual inspection are entered into a computer (which is an example of the "input apparatus"), and are transmitted, together with the results of the inspection by the inspection apparatus, to the quality control system 1 in the form of electronic data.

The conveyor C is a device capable of conveying vehicle bodies B along its conveyance path. The conveyor C is provided with (i) a vehicle body identifying device D capable of reading the vehicle identification number (which is an example of the "individual identification information") assigned to each vehicle body B and (ii) an encoder E capable of detecting the amount of movement of vehicle bodies B.

The painting line 100 is capable of performing paint work on a plurality of vehicle bodies B simultaneously. FIG. 1 illustrates an example state in which inspection of a vehicle body B1 (that is, the inspection step 107), drying of a vehicle body B2 (that is, the drying step 105), and dip cleaning of a vehicle body B3 (that is, the second pretreatment step 102) are being performed in parallel.

Figure 2:
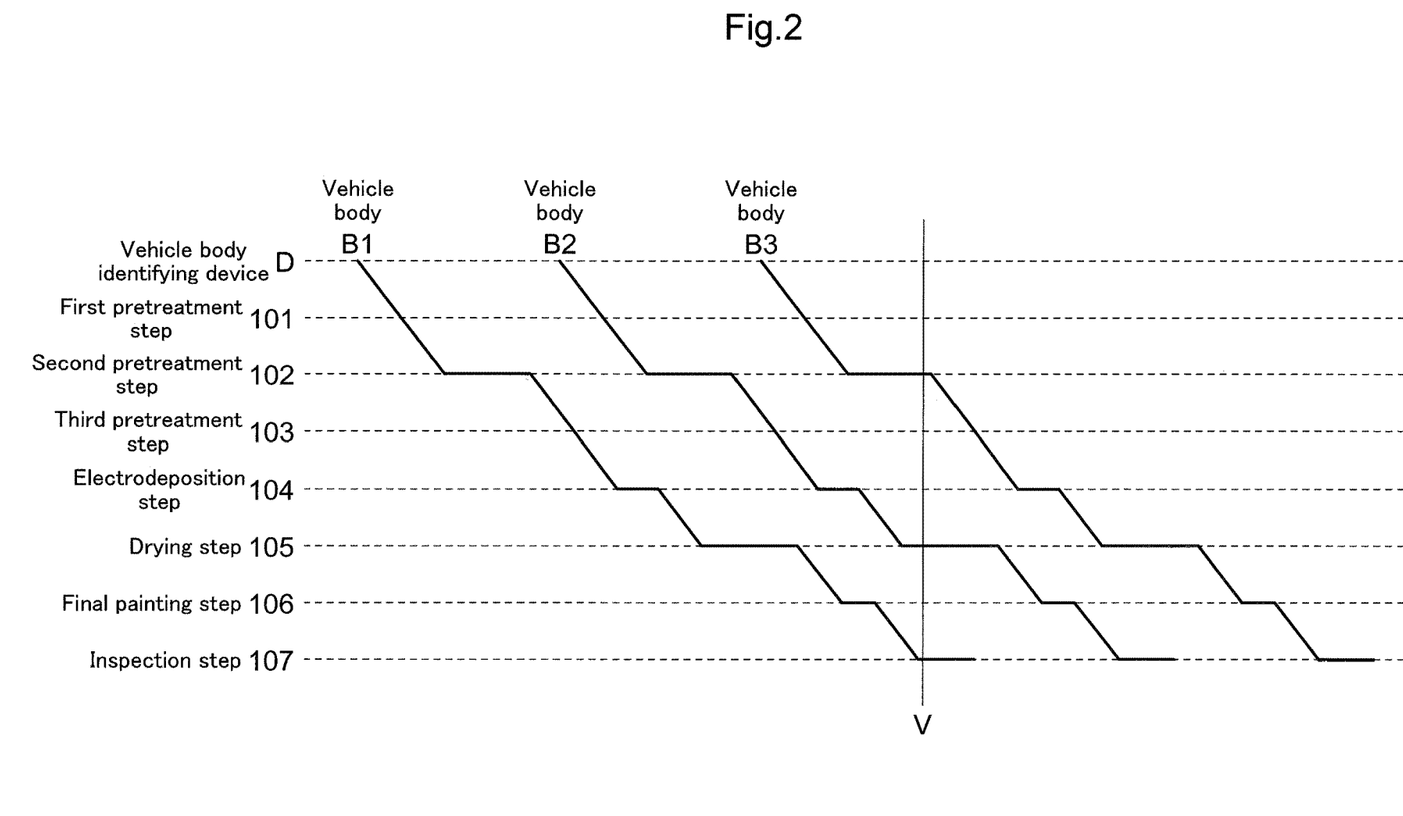
FIG. 2 is a drawing illustrating how vehicle bodies are conveyed on a painting line for an embodiment of the present invention.

FIG. 2 illustrates how individual vehicle bodies B (namely, vehicle bodies B1 to B3) are sequentially subjected to the individual steps. FIG. 2 shows (i) horizontal broken lines to indicate respective temporal axes for the individual facilities and (ii) solid lines to indicate how the vehicle bodies B are conveyed. For instance, the solid lines indicative of how vehicle bodies B are conveyed each cross the broken line for the first pretreatment step 101 at a point and the broken line for the third pretreatment step 103 at a point. This indicates that vehicle bodies B pass through each of the first pretreatment step 101 and the third pretreatment step 103 without stopping at it. The solid lines indicative of how vehicle bodies B are conveyed each coincide with the broken line for any other facility such as the facility for the second pretreatment step 102 over a predetermined length. This indicates that vehicle bodies B stop at each of those facilities and are subjected to paint work at the facility over the time period during which the vehicle bodies B are at rest. FIG. 2 shows a vertical line V to indicate the time point corresponding to the state illustrated in FIG. 1.

Arrangement of Quality Control System

The description below deals with how the quality control system 1 as the present embodiment is arranged. The quality control system 1 includes an input device 2, an individual identification section 3, a state value computing section 4, a storage device 5, a learning section 6, and a user interface device 7 (see FIG. 3).

Figure 3:
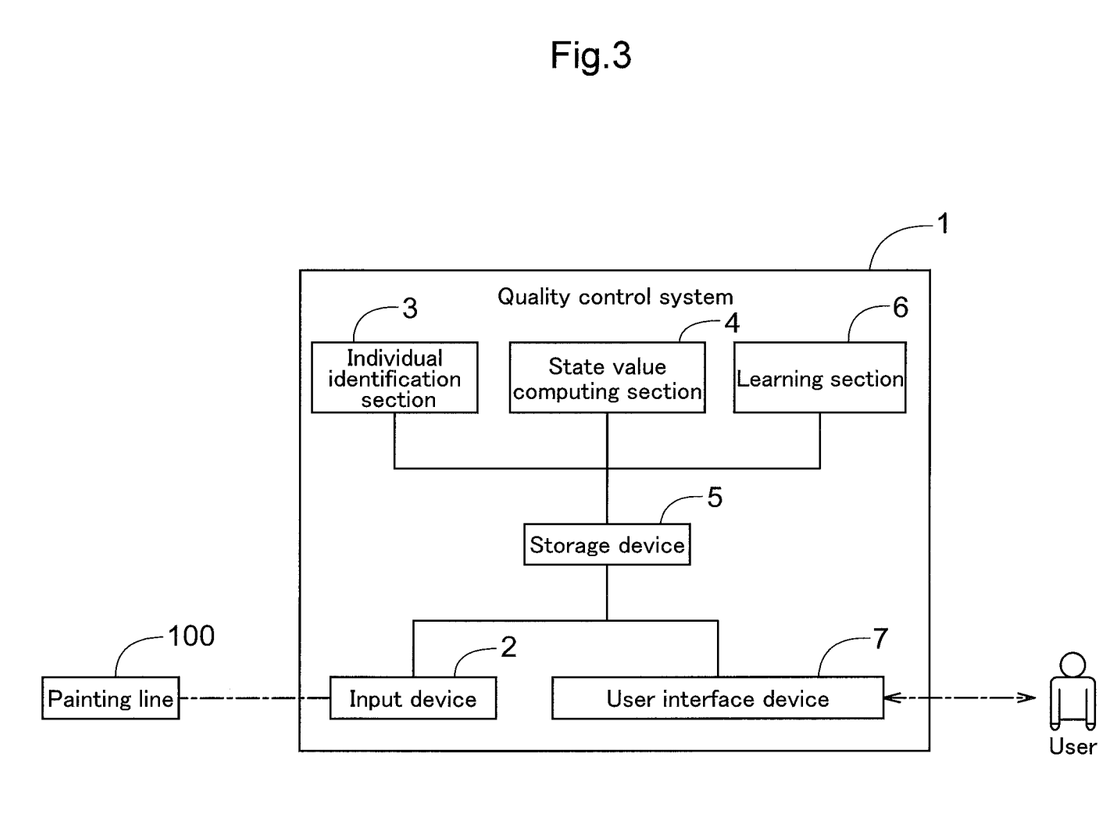
FIG. 3 is a diagram illustrating the configuration of a quality control system as an embodiment of the present invention.

The input device 2 is capable of receiving information on the movement amount detected by the encoder E, the temperature and humidity measured in the first pretreatment step 101, the temperature measured in the second pretreatment step 102, the flow rate and pressure measured in the third pretreatment step 103, the electric current value measured in the electrodeposition step 104, the temperature measured in the drying step 105, the rotation speed measured in the final painting step 106 as well as information on the hues, gloss, and smoothness detected in the inspection step 107 and the presence or absence of contamination, crawling, and unevenness determined in the inspection step 107.

Figure 4:
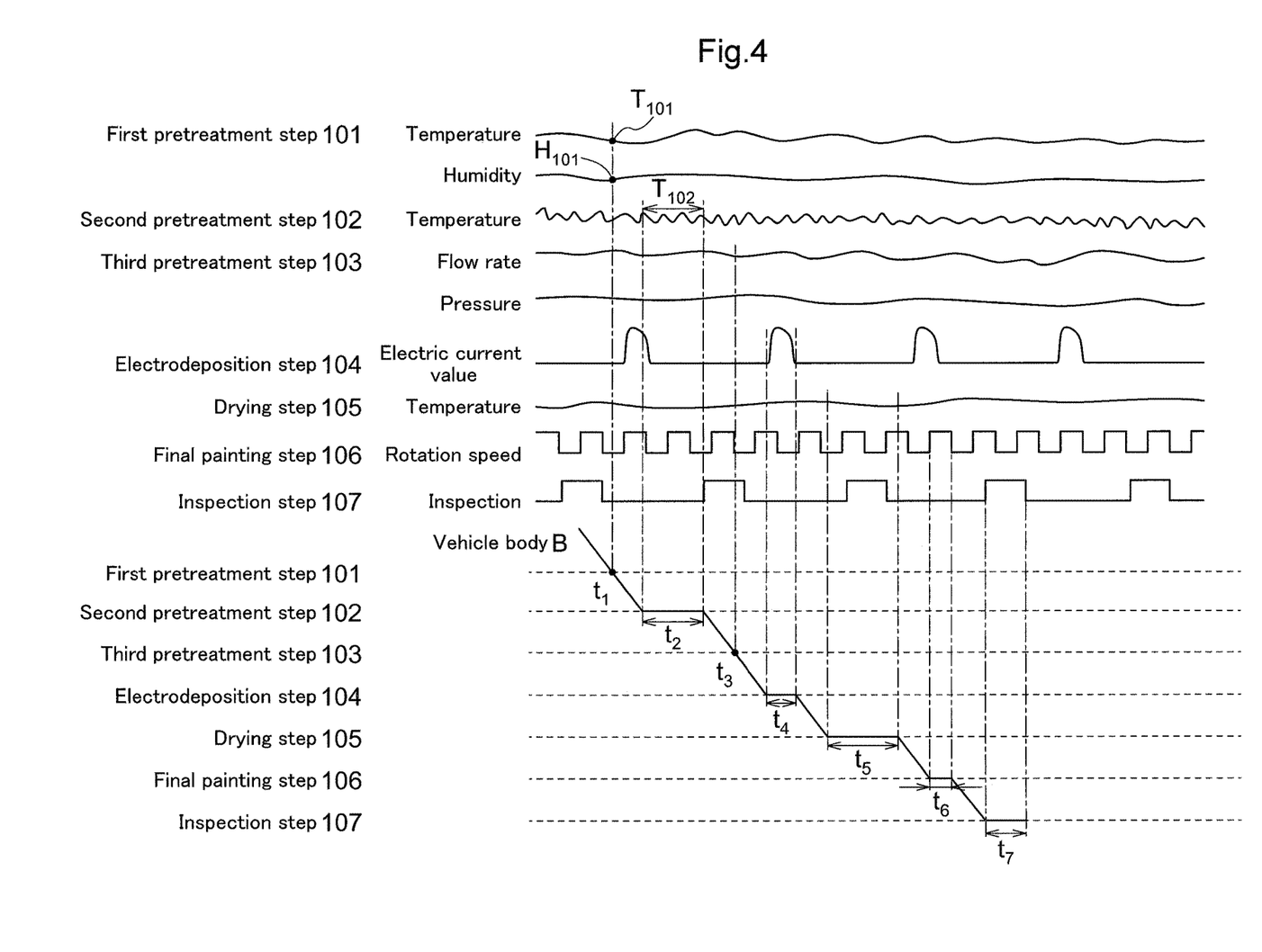
FIG. 4 is a diagram schematically illustrating data inputted to a quality control system as an embodiment of the present invention.

The information on the movement amount, step control values, and quality control values inputted to the input device 2 is in the form of a temporal change history (see the upper portion of FIG. 4). Since the painting line 100 performs paint work on a plurality of vehicle bodies B simultaneously as mentioned above, information inputted to the input device 2 includes information on a plurality of vehicle bodies B. This would make it impossible to link step control values and quality control values for each vehicle body B without a further arrangement.

The individual identification section 3 is capable of associating step control values and quality control values inputted to the input device 2 with the vehicle identification number of the corresponding vehicle body B on the basis of the movement amount inputted to the input device 2. The individual identification section 3 first determines, on the basis of the movement amount, at which facility the vehicle body B identified by the vehicle identification number read by the vehicle body identifying device D was present at which time point. FIG. 4 shows in its lower portion how a vehicle body B is sequentially subjected to the individual steps, in a manner similar to FIG. 2. The individual identification section 3 determines, on the basis of how a vehicle body B was conveyed as determined in the drawing, the respective time points and time periods $t_1$ to $t_7$ at and during which work was performed as the steps 101 to 107, such as the time point $t_1$ at which the vehicle body B was painted as the first pretreatment step 101 and the time period $t_2$ during which the vehicle body B was painted as the second pretreatment step 102.

Next, the individual identification section 3 determines, on the basis of the time points and time periods $t_1$ to $t_7$ determined as above, the time points and time periods at and during which the vehicle body B identified by a vehicle identification number was subjected to work at the individual facilities. The individual identification section 3 then associates step control values and quality control values with the vehicle identification number on the basis of the time points and time periods determined as above. For instance, since the vehicle body B was painted in the first pretreatment step 101 at the time point $t_1$, the individual identification section 3 determines the temperature $T_{101}$ and humidity $H_{101}$ in the first pretreatment step 101 at the time point $t_1$ as being the temperature and humidity during the painting operation for the vehicle body B in the first pretreatment step 101. The individual identification section 3 also determines the average temperature $T_{102}$ in the second pretreatment step 102 during the time period $t_2$, during which the vehicle body B was painted as the second pretreatment step 102, as being the temperature during the painting operation for the vehicle body B in the second pretreatment step 102. The individual identification section 3 may associate, with a vehicle identification number, (i) a step control value as measured or (ii) a value calculated through an arithmetic operation such as an average value as in the above example.

The state value computing section 4 is capable of calculating a state value indicative of the paint state of a vehicle body B on the basis of a temporal change history for step control values inputted to the input device 2. The state value thus calculated is associated with that vehicle identification number with which the above step control values as the basis are associated.

Figure 6:
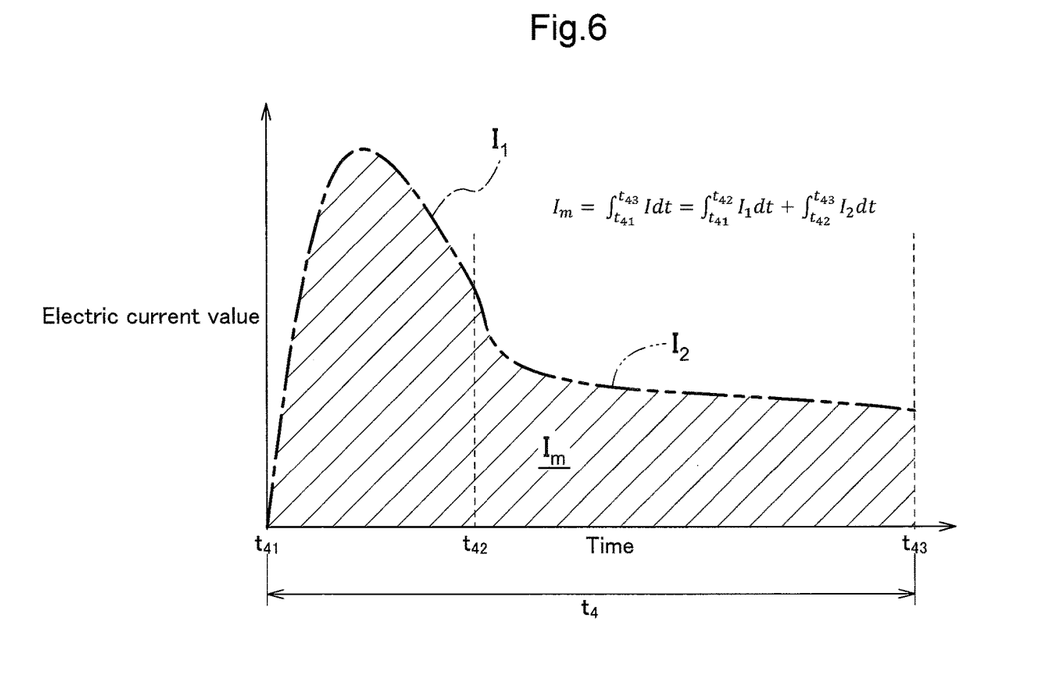
FIG. 6 is a diagram illustrating an example arithmetic operation of a state value for an electrodeposition step.

For instance, the paint state resulting from electrodeposition painting in the electrodeposition step 104 can be evaluated on the basis of the integral of the value of electric current flowing through the electrodeposition painting device. Thus, to calculate the state value of a vehicle body B for the electrodeposition step 104, the state value computing section 4 integrates the value of electric current inputted to the input device 2 with respect to the time period $t_4$ during which the vehicle body B was being subjected to electrodeposition painting. FIG. 6 illustrates an example of how an electric current value changes during the time period $t_4$. The state value for electrodeposition painting is represented by the value $I_m$ obtained by integrating the electric current value I with respect to the time period $t_4$ extending from the starting point $t_{41}$ to the ending point $t_{43}$, that is, the area of the region between the line indicative of the electric current value and the time point axis. FIG. 6 illustrates an example in which the state value is calculated with use of (i) a measurement value $I_1$ of a first ammeter (see the single-dashed chain line in FIG. 6) for that portion of the time period $t_4$ which extends from the starting point $t_{41}$ to an intermediate point $t_{42}$, and (ii) a measurement value $I_2$ of a second ammeter (see the double-dashed chain line in FIG. 6) for that portion of the time period $t_4$ which extends from the intermediate point $t_{42}$ to the ending point $t_{43}$. The state value computing section 4 may, on the basis of respective measurement values from a plurality of ammeters, calculate the total integral of electric current that flowed through a vehicle body B as described above.

Figure 7:
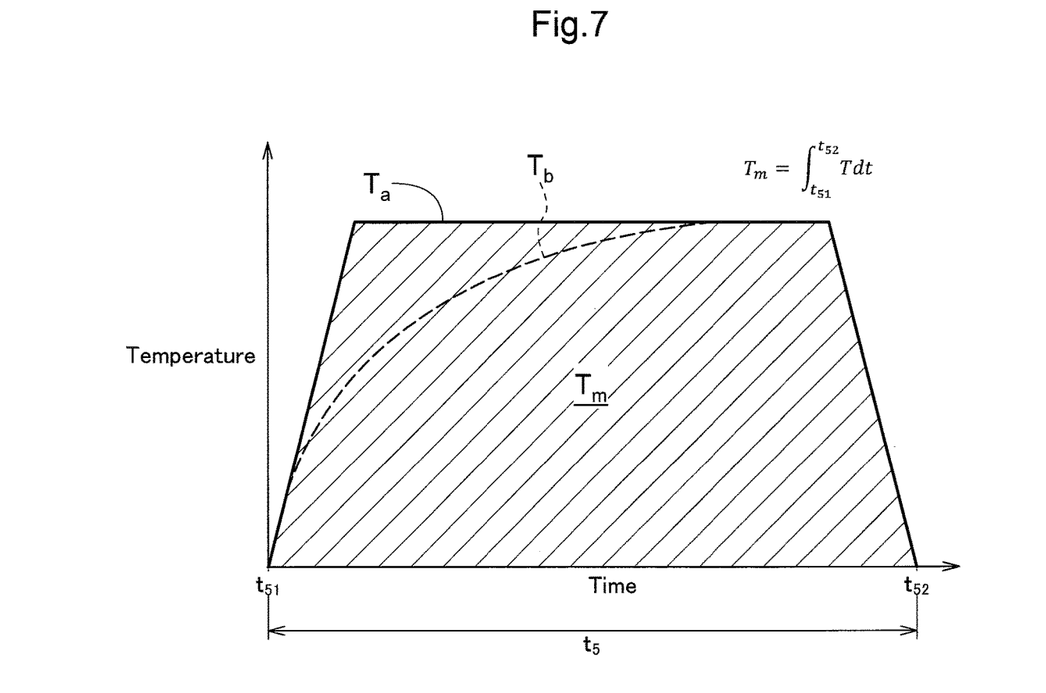
FIG. 7 is a diagram illustrating an example arithmetic operation of a state value for a drying step.

Similarly, the state value computing section 4 outputs, as the state value of a vehicle body B for the drying step 105, the value obtained by integrating the temperature value inputted to the input device 2 with respect to the time period $t_5$ during which the vehicle body B was being dried. FIG. 7 illustrates an example of how a temperature value changes during the time period $t_5$. The state value for drying is represented by the value $T_m$ obtained by integrating the value of the temperature of a vehicle body B with respect to the time period $t_5$ extending from the starting point $t_{51}$ to the ending point $t_{52}$, that is, the area of the region between the line indicative of the temperature value and the time point axis. FIG. 7 illustrates an example $T_a$ in which the temperature behavior during the drying operation is normal (see the solid line in FIG. 7) and an example $T_b$ in which the rate of temperature rise is lower than usual (see the broken line in FIG. 7). A comparison between the example $T_a$ of normal temperature behavior and the example $T_b$ of an abnormal rate of temperature rise shows that although the respective highest reaching temperatures are equivalent to each other, the integral $T_m$ is smaller for the example $T_b$. This indicates that an abnormality difficult to detect on the basis of a measured temperature value itself may be detected with reference to a state value.

The storage device 5 is capable of storing information on a vehicle identification number and a set of step control values, state values, and quality control values all of which are associated with the vehicle identification number. Specifically, the storage device 5 stores a database including data on a vehicle identification number as a key, step control values, state values, and quality control values.

The learning section 6 is capable of learning the correlation between step control values, state values, and quality control values with use of data on a plurality of sets of step control values, state values, and quality control values which data is stored in the storage device 5. Examples of the algorithm used by the learning section 6 for its learning process include linear regression, random forest, Bayes, logistic regression, and support vector machine. A quality control value may be influenced by any of various step control items and state values, which makes it practically impossible to make the correlation therebetween clear with human efforts. The correlation can, however, be made clear with use of the algorithm such as the above. The learning section 6 constructs a learned model for step control values, state values, and quality control values as above. The learned model is stored in the storage device 5.

Figure 5:
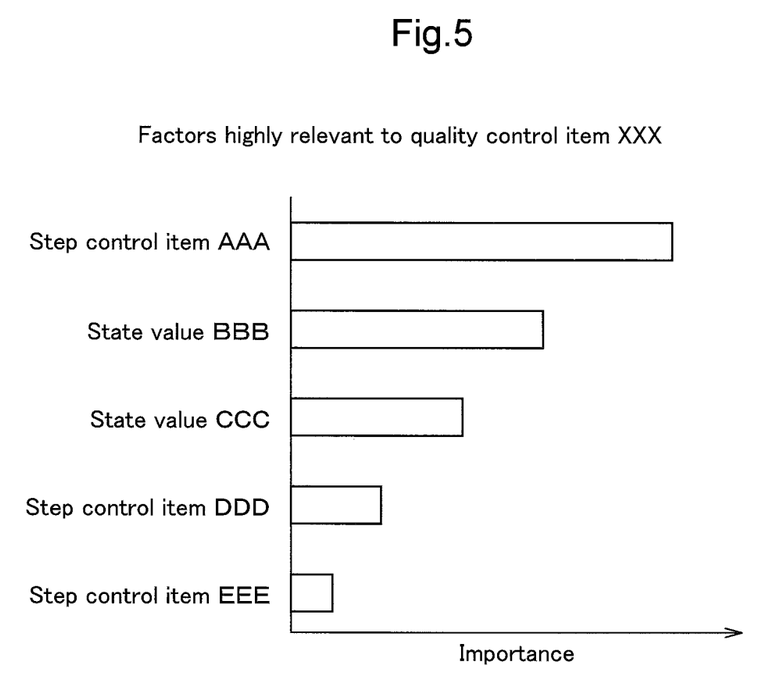
FIG. 5 is an example output of a quality control system as an embodiment of the present invention.

The user interface device 7 receives an input from a user into the quality control system 1 and provides an output from the quality control system 1 for the user. The user can view, for example, a database stored in the storage device 5 or the result of a learning process by the learning section 6 via the user interface device 7. For instance, if the user specifies a quality control item through the user interface device 7, the quality control system 1 outputs, through the user interface device 7, information on any step control item(s) and/or state value(s) ranked high on the list of influence on the quality control item specified (see FIG. 5).

The above-described individual sections of the quality control system 1 may each be in the form of a publicly known computer or peripheral device. The input device 2 may be in the form of an input interface in wired or wireless connection with each paint facility and capable of receiving signals from each paint facility. The respective computing processes by the individual identification section 3, the state value computing section 4, and the learning section 6 may each be performed with use of a publicly known processing unit such as a CPU. The storage device 5 may be in the form of a publicly known storage device such as a hard disk or semiconductor memory. The user interface device 7 may be in the form of (i) a device capable of both input and output such as a touch screen or (ii) a combination of an input unit such as a keyboard or mouse and an output unit such as a display.

Variations

The quality control system 1 described above may further include a prediction section capable of predicting a quality control value related to the quality of a vehicle body B on the basis of (i) a step control value(s), (ii) a state value(s) calculated on the basis of the step control value, and (iii) a correlation learned by the learning section 6. The prediction section may be capable of predicting, for example, a quality control value for a vehicle body B that has been subjected to the steps 101 to 104, on the basis of (i) the temperature and humidity in the first pretreatment step 101, (ii) the temperature in the second pretreatment step 102, (iii) the flow rate and pressure in the third pretreatment step 103, and (iv) the electric current value in the electrodeposition step 104 as well as a state value based on the electric current value. The prediction section may also be capable of predicting a quality control value for a vehicle body B to be painted, on the basis of the history of step control values for each of a plurality of vehicle bodies B that have been painted. The quality control system 1 may, if including such a prediction section, be configured to trigger an alarm if a predicted quality control value meets a predetermined warning criterion. The quality control system 1 may, if configured to trigger an alarm, include a dedicated alarm device (such as a sound alarm or a warning lamp) or be configured to trigger an alarm through the user interface device 7.

The quality control system 1 may further be capable of, if a predicted quality control value fails to reach a predetermined quality target, suggesting a change to an operating condition for the steps 101 to 106 which change is necessary to reach the quality target. The quality control system 1 may additionally be configured to actually change an operating condition for the steps 101 to 106 as it suggested. For instance, the quality control system 1 may be configured to, if it predicts that a quality control value for a vehicle body B having been subjected to the steps 101 to 104 will fail to reach a quality target, (i) change an operating condition for the steps 105 and 106 for the vehicle body B to reach the quality target and (ii) also change an operating condition for the steps 101 to 104 for a subsequent (other) vehicle body B to reach the quality target.

Example forms of process control that can be performed on the basis of a quality control value predicted by the prediction section include not only the above example but also (i) suggesting, for example, repairing or replacing a painting device used in any of the steps 101 to 106 and (ii) suggesting suspending the entire painting line 100. Utilizing a predicted quality control value in a form as thus exemplified can reduce a product loss as well as a time loss and cost loss associated with the product loss.

Other Embodiments

Finally, the description below deals with other embodiments of the quality control system and quality control program according to the present invention. The arrangement disclosed for any embodiment below is combinable with the arrangement disclosed for any other embodiment unless such a combination causes any convenience.

The embodiment described above is, as an embodiment of the present invention, a quality control system 1 including an input device 2, an individual identification section 3, a state value computing section 4, a storage device 5, a learning section 6, and a user interface device 7. The present invention may alternatively be embodied as a quality control program configured to cause a computer to perform functions similar to those of the quality control system 1 described above.

The embodiment described above is an example involving, as step control values to be detected, the temperature, humidity, flow rate, air pressure, and rotation speed of paint facilities, the electric current value of an electrodeposition painting device, and the temperature of a drying facility. The present invention is, however, not limited to such an arrangement. The quality control system according to the present invention may detect, as step control values, not only the step control values exemplified above but also, for example, the pressure inside the paint booth, the flow rate of a painting material, the amount of dust in a step, the frequency of door opening and closing, the viscosity of a painting material, and/or the amount of a nonvolatile component of a painting material.

The embodiment described above is an example involving, as quality control values to be detected, hues, gloss, smoothness, the presence or absence of contamination, the presence or absence of crawling, and the presence or absence of unevenness. The present invention is, however, not limited to such an arrangement. The quality control system according to the present invention may detect, as quality control values, not only the quality control values exemplified above but also any paint quality indicator such as the presence or absence of a pinhole.

The embodiment described above is an example in which the state value computing section 4 calculates a state value for the electrodeposition step 104 and a state value for the drying step 105. The present invention is, however, not limited to such an arrangement. The quality control system according to the present invention may be capable of calculating a state value indicative of the state of a paint facility for every step.

The embodiment described above is an example in which the quality control system 1 includes a user interface device 7 configured to receive an input from a user into the quality control system 1 and provide an output from the quality control system 1 for the user. The quality control system according to the present invention, however, does not necessarily include a user interface device. If the quality control system according to the present invention does not include a user interface device, it may, for example, accumulate information on a correlation learned by the learning section on a server device external to the quality control system according to the present invention.

The embodiment described above is an example involving a vehicle body B as a paint target. The present invention is, however, not limited to such an arrangement. The quality control system according to the present invention may be used for a painting line for painting any paint target. The embodiment described above is an example involving identifying an individual vehicle body B with use of a vehicle identification number. The quality control system according to the present invention may, however, use any individual identification information associated with a paint target.

Embodiments of any arrangement other than the above that are disclosed in the present specification are also mere examples in all respects, and do not limit the scope of the present invention. A person skilled in the art will easily understand that the embodiments may be modified as appropriate without departing from the object of the present invention. The present invention thus naturally covers in its scope any embodiment as modified without departing from the object of the present invention.

INDUSTRIAL APPLICABILITY

The present invention is applicable to, for example, a quality control system for a painting line for painting an automobile body.

REFERENCE SIGNS LIST

1 Quality control system
2 Input device
3 Individual identification section
4 State value computing section
5 Storage device
6 Learning section
7 User interface device
100 Painting line
101 First pretreatment step
102 Second pretreatment step
103 Third pretreatment step
104 Electrodeposition step
105 Drying step
106 Final painting step
107 Inspection step
C Conveyor
D Vehicle body identifying device
E Encoder
B Vehicle body

The invention claimed is:

1. A quality control system comprising:
an identifying device that acquires individual identification information for identifying a paint target;
a conveying apparatus configured to convey the paint target;
a painting apparatus that performs a painting operation on the paint target conveyed by the conveying apparatus;
a step control value acquiring section configured to acquire a step control value concerning the painting operation on the paint target;
a state value computing section configured to calculate a state value indicative of the paint state of the paint target by taking the integral of the step control value over a time period during which the painting operation is conducted on the paint target;
a quality control value acquiring section configured to acquire a quality control value concerning the paint target on which the painting operation is applied; and
a learning section configured to learn a correlation between the step control value, the state value, and the quality control value, based on the individual identification information of the paint target, the step control value, the state value, and the quality control value.

2. The quality control system according to claim 1, further comprising:
a user interface device, wherein
if a particular one of one or more quality control items has been selected via the user interface device, the quality control system outputs information on the step control value and the state value that are ranked high on a list of influence on the particular one of the one or more quality control items.

3. The quality control system according to claim 1, further comprising:
a prediction section that predicts the quality control value on a basis of the step control values, the state values, and the correlation.

4. The quality control system according to claim 3, wherein
the prediction section triggers an alarm if the quality control value that the prediction section predicts meets a predetermined warning criterion.

5. The quality control system according to claim 3, wherein
if the quality control value that the prediction section predicts fails to reach a predetermined quality target, the prediction section suggests a change to an operating condition for the painting apparatus which change is necessary to reach the quality target.

6. The quality control system according to claim 1, wherein
the paint target is an automobile body, and
the individual identification information is a vehicle identification number.

7. The quality control system according to claim 1,
wherein the painting operation is electrodeposition painting.

8. The quality control system according to claim 7,
wherein the step control value is a value of electric current flowing through an electrodeposition painting apparatus.

9. The quality control system according to claim 1,
wherein the painting operation is final painting.

10. The quality control system according to claim 9, wherein the step control value is a rotational speed of a painting machine.

11. The quality control system according to claim 1, wherein the quality control value is one of hues, gloss and smoothness.

12. The quality control system according to claim 1, wherein the quality control value is one of presence or absence of contamination, crawling, and unevenness.

13. The quality control system according to claim 1, further comprising:
a cleaning apparatus that cleans the paint target before the painting operation.

14. The quality control system according to claim 1, further comprising:
a drying apparatus that dries the paint target after the painting operation.

15. The quality control system according to claim 1, wherein the identifying device is provided in the conveying apparatus.

16. The quality control system according to claim 1, further comprising:
a storage device that stores a set of the individual identification information, the quality control value and the step control value.

* * * * *